2 Sheets—Sheet 1.

G. GAVIT.

MACHINE FOR GRINDING ROLLS.

No. 7,102. Reissued May 9, 1876.

Witnesses

Albert Zacherle

J. Elmer Hall

Inventor

Gorton Gavit by George E. Buckley

Atty.

N. PETERS, PHOTO-LITHOGRAPHER, WASHINGTON, D. C.

2 Sheets—Sheet 2.

G. GAVIT.

MACHINE FOR GRINDING ROLLS.

No. 7,102. Reissued May 9, 1876.

Witnesses

Albert E. Zacherle

J. Elmer Hall

Inventor.

Gorton Gavit by George E. Buckley

Atty.

N. PETERS, PHOTO-LITHOGRAPHER, WASHINGTON, D. C.

UNITED STATES PATENT OFFICE.

GORTON GAVIT, OF PHILADELPHIA, PENNSYLVANIA.

IMPROVEMENT IN MACHINES FOR GRINDING ROLLS.

Specification forming part of Letters Patent No. 151,485, dated June 2, 1874; reissue No. 7,102, dated May 9, 1876; application filed April 20, 1876.

*To all whom it may concern:*

Be it known that I, GORTON GAVIT, of the city and county of Philadelphia, and State of Pennsylvania, have invented an Improvement in Machines for Grinding Rolls, of which the following is a specification:

My invention consists of the combination, with the revolving grindstones of a grinding-machine, of a fixed revolving shaft, two movable pulleys to turn the stones, and an intermediate adjustable pulley, so arranged that while all are turned by one belt from the fixed shaft the intermediate pulley, by changing its position, takes up any slack from, or gives slack to, the belt for any approach or retrogression of the two movable pulleys toward or from each other; also, of the combination of a fixed revolving shaft, two movable pulleys on the stone-shafts, and an intermediate pulley located between the two movable pulleys and the shaft which drives them, the intermediate pulley taking up between the movable pulleys the belt which drives them from said fixed shaft, practically permitting some play in moving said shifting pulleys toward and from each other; also, of the combination, with adjustable carriages which carry a pair of grinding-wheels, of a series of pivoted bars, for supporting the belt-adjusting device, as hereinafter fully described.

Figure 1:
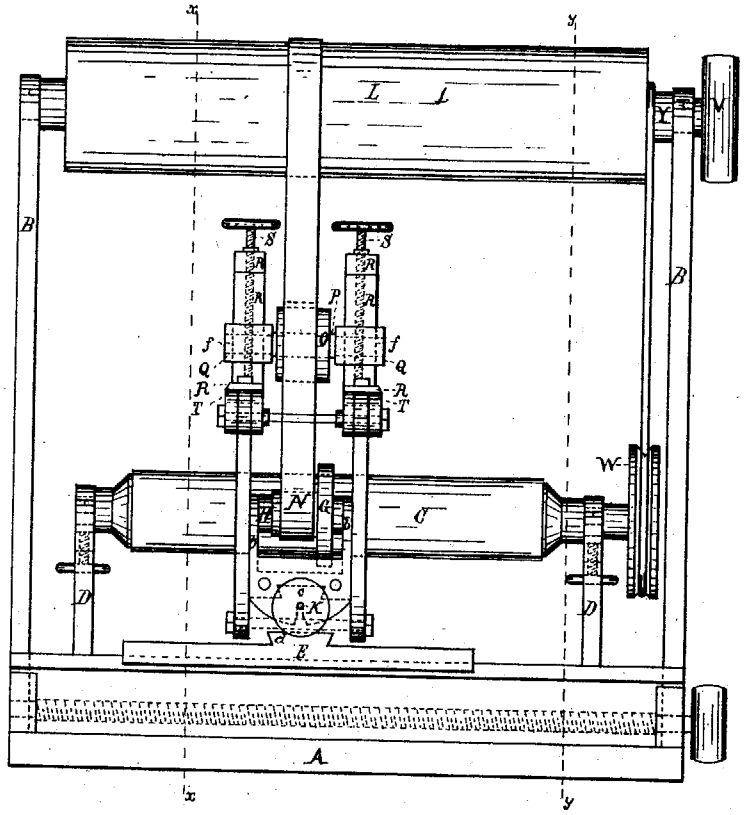
Figure 3:
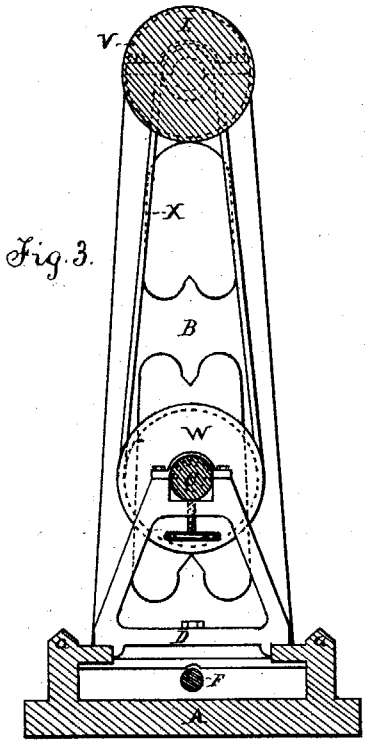
Figure 2:
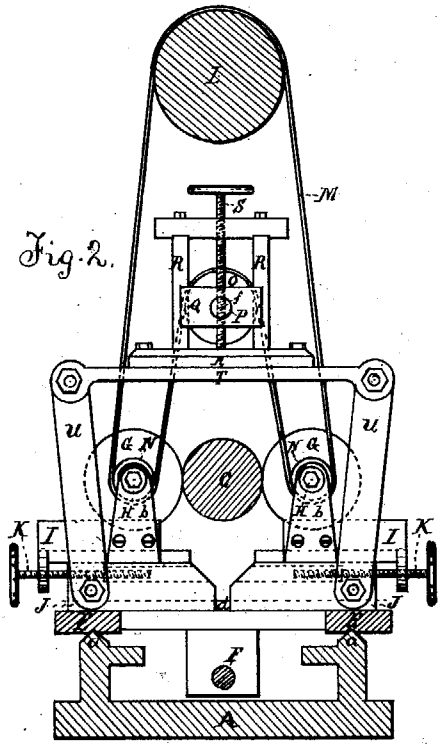

In the drawings, Figure 1 is a side elevation of my improved machine. Fig. 2 is a vertical section at the line *x x* of Fig. 1. Fig. 3 is a like section at the line *y y*.

Like letters of reference in all the figures indicate the same parts.

A is the bed-plate of the machine. B B are the housings. C is the roll to be ground. D D are pedestals, which support the journals of the roll. E is a slide, which has a longitudinal movement on the V-shaped guides *a a*, for carrying the grinding-wheels back and forth from end to end of the roll, the movement of the slide being given by the longitudinal screw-rod F. G G are the grinding-wheels, whose shafts H H have their bearings in cheeks *b b* of the carriages I I. These blocks are connected with the carriages J J by means of the dovetail guides *c c*, and have an accurate adjustment thereon by means of the screw-rods K K for setting the wheels. The carriages J J also have an adjustment toward or from the roll C, being connected with the dovetail guide *d* of the slide E. L is a drum or fixed revolving shaft, whose journals *e e* are supported in the upper ends of the housings B B. M is a belt for driving the grinding-wheels. It passes around the drum, the pulleys N N on the shafts H H of said wheel, and the intermediate pulley O of the shaft P. Thus a uniform and simultaneous movement is given to the two wheels by a single belt. Q Q are bearings, which support the journals *f f* of the shaft P. They have a vertical adjustment in the pedestals R R by means of the screw-rods S S, for regulating the tightening of the belt M. The pedestals are connected with the horizontal cross-bars T T, that have a joint-connection with the carriages J J by means of the vertical rods U U, as seen in Figs. 1 and 2, which admits of the carriages being moved inward or outward for a partial adjustment of the grinding-wheels G G, above described. When the carriages, and consequently the pulleys N N, are moved apart, the pulley O is first lowered to give the necessary slack. When, on the contrary, the pulleys N N are moved toward each other, the pulley O is elevated to take up the slack of belt thus occasioned. On one end of the shaft of the drum L there is a pulley, V, which connects, by means of a belt, with the motive power. W is a pulley, connected with one end of the rolls C. A belt or band, X, connects with this pulley and the pulley Y on the drum-shaft, for communicating motion to the roll. The belt M half encircles the pulleys N N, and gives great power, as well as avoids the danger of its slipping upon them. The shifting of the stones G G toward or from each other is to permit the grinding of variously-sized rolls C between them.

It will be seen, by reference to drawing, Fig. 2, that the parts of belting M between points L O and N N, like the legs of a pair of pantaloons, of which O is the crotch, form radii from a point between points L and O as a center to the points N N, which, in practice, permit N and N some little lateral play in shifting without requiring adjustment of pulley O.

Having thus described my invention, what I claim as new, and desire to secure by Letters Patent, is—

1. In combination with the revolving grindstones of a grinding-machine, a fixed revolving shaft or drum, two movable pulleys to turn the stones, an intermediate adjustable pulley, and a single belt passing over and driving all the rest from said fixed revolving shaft or drum, the said intermediate pulley to take up and give slack belt from and to the movable pulleys, substantially as described.

2. The combination of a revolving shaft, two movable pulleys to turn the stones, and an intermediate pulley, located at a point between the two movable pulleys and the said revolving shaft, from which they are driven, all turned by, and running on, one belt, the said intermediate pulley to take up between said movable pulleys the belt which drives them from said fixed shaft, substantially as set forth, and for the purpose described.

3. In a machine for grinding rolls, in combination with the adjustable carriages I I J J, carrying the grinding-wheels, the pivoted bars U U U U and T T, for supporting the belt-adjusting device, substantially as described.

GORTON GAVIT.

Witnesses:
A. F. BLAIR,
GEORGE E. BUCKLEY.